May 14, 1963 R. S. ENGELBRECHT ETAL 3,090,009

NOISE FIGURE IMPROVEMENT IN RADIO RECEIVERS

Filed Dec. 30, 1958

INVENTORS R.S. ENGELBRECHT
W.W. MUMFORD
BY [signature]
ATTORNEY 3,090,009
Patented May 14, 1963

1

3,090,009

NOISE FIGURE IMPROVEMENT IN RADIO RECEIVERS

Rudolf S. Engelbrecht, Basking Ridge, and William W. Mumford, Morris Plains, N.J., assignors to Bell Telephone Laboratories, Incorporated, New York, N.Y., a corporation of New York Filed Dec. 30, 1958, Ser. No. 783,992
4 Claims. (Cl. 325—479)

Figure 1:
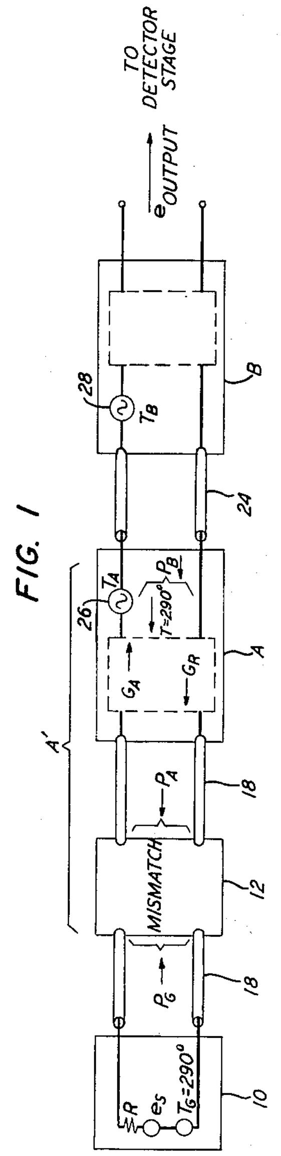

This invention relates in general to noise figure improvement for radio receivers and in particular to a microwave receiver which utilizes the principles of noise cancellation by mismatching to improve the noise figure thereof.

The useful reception of radio signals is limited in the main to those signals which exceed the unavoidable noise of the communication system. From the standpoint of noise, a receiver or an element of a receiver is rated in terms of the "noise figure." According to common practice, the noise figure of a network with a generator connected to its input terminals is the ratio of the available signal-to-noise power ratio at the signal generator terminals (weighted by the network bandwith when the generator noise temperature is 290 degrees absolute) to the available signal-to-noise power ratio at the network output terminals. The noise figure of a network can be considered to be a measure of the sensitivity of that network.

At low frequencies the inherent or internal noise in a radio receiver is usually small compared with the external noise such as static which is present with the signal most of the time. Since the greater part of the noise is from sources external to the receiver and arrives at the receiver with the signal, there is little advantage in attempting to improve the noise figure by impedance matching for maximum power transfer or by providing an exceedingly quiet first stage. When signal frequencies of several tens of megacycles or higher are reached, the static or external noise accompanying the signal often becomes sufficiently reduced relative to the signal so that the receiver noise begins to be important. In such cases relatively quiet radio frequency amplifiers are commonly used and precede the more noisy converters in order to keep the noise figure of the first stage of the receiver at a minimum thereby appreciably effecting the over-all noise figure of the receiver.

When the microwave region, that is, the region above or around 1000 megacycles, is reached, the receiver noise becomes increasingly important. However, commonly available radio frequency amplifiers for these frequencies have no better noise figure than the converters and consequently the antenna is usually connected directly to the converter. Therefore, a very significant noise source in such a system is the converter stage itself. This being the case, an important application of the principle of noise cancellation by mismatching is encountered in microwave receivers where the converter stage is connected directly to the antenna and the first intermediate frequency amplifier is the second network (and usually the only additional source of noise that need be considered).

It is therefore an object of this invention to improve the noise figure and hence the sensitivity of radio receivers.

The external noise received at the input to a radio receiver can be considered to be equivalent to pure thermal (Johnson) noise. This energy can be represented by an average or effective absolute temperature which corresponds to the noise generated in a resistor at that temperature. Thus, the higher the equivalent temperature the more noise energy it represents. The effective antenna noise temperature in the microwave region may be near or even considerably below room temperature (290 degrees Kelvin) in many cases. In contrast the effective input noise temperature of many conventional receiver components may be considerably above 290 degrees Kelvin. This merely means that much of the noise in the receiver is introduced by the components of the receiver itself rather than by the external noise sources.

2

For example, the effective output noise temperature of present crystal converted diodes is generally not much greater than 290 degrees Kelvin at 30 or 60 megacycles but increases at low frequencies so that at 100,000 cycles it may typically be 5000 to 10,000 degrees Kelvin. Therefore, the noise figure of a microwave receiver using low intermediate frequencies and a crystal converted diode connected directly between the antenna and the intermediate frequency amplifier is limited largely by the crystal converter noise. In bilateral circuits as described above where point sources of noise, such as a crystal diode converter stage, are predominant, an improvement in the noise figure of the receiver is possible by using an appropriate impedance mismatch ahead of the source of the noise.

Figure 2:
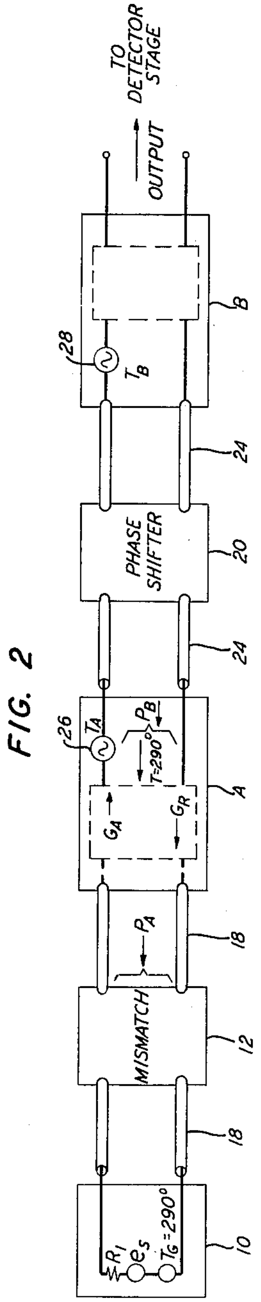
Figure 3:
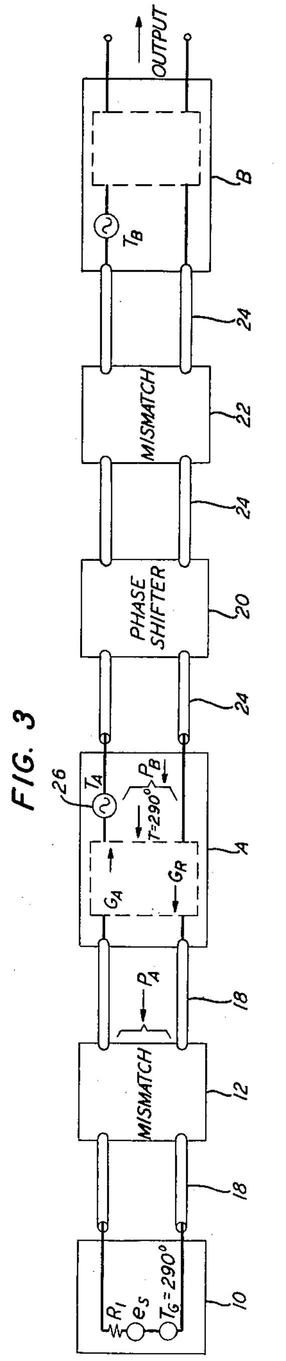

The above and other features of the invention will be considered in more detail in the following description taken in connection with the drawing wherein:

FIG. 1 is a block diagram illustrating one embodiment of the applicants' invention in which a mismatch is placed in the radio frequency circuit and adjusted so as to cancel a portion of the noise which originates in the converter at the intermediate frequency;

FIG. 2 is a block diagram of another embodiment of the applicant's invention in which a mismatch in the radio frequency circuit is used in combination with an intermediate frequency phase shifter so that the radio frequency mismatch tends to cancel not only the noise originating in the intermediate frequency side of the converter but also the noise originating at the input of the intermediate frequency amplifier; and FIG. 3 is a block diagram of another embodiment of the applicants' invention in which a mismatch in the radio frequency path is used in combination with a phase shifter in the intermediate frequency path and a mismatch in the intermediate frequency path so as to further reduce the noise originating in the input circuit of the intermediate frequency amplifier as well as the noise originating in the intermediate frequency side of the converter.

It is known in transmission line theory that when a transmission line is terminated in a load having what is termed the characteristic impedance of that transmission line and the internal impedance of the input signal generator is equal to this characteristic impedance of the transmission line, then maximum power transfer occurs between the input signal generator and the load terminating the transmission line. If the transmission line is not terminated in its characteristic impedance or if any discontinuities are introduced along the transmission line then energy is reflected at the discontinuity or at the improperly terminated load and maximum energy transfer does not occur. The wave can then be considered to be the vector sum of two waves traveling in opposite directions. The wave traveling in the forward or desired direction is called the "incident wave" and the wave traveling in the opposite direction is called the "reflected wave." The complex ratio of the "reflected wave" to the "incident wave" is referred to as the "reflection coefficient." Also it is known that the electrical length of a transmission path is a function of frequency and also that the reflection coefficient introduced by any discontinuity in a transmission line is also a function of frequency. Therefore, it can be seen that if a discontinuity is inserted in a transmission line between a signal source and the termination of the transmission line then the reflected component will vary in amplitude as the frequency varies. Also it can be seen that if the discontinuity in the transmission line is moved to various locations along a lossless transmission line the reflected wave will vary in phase relation to the signal source although it will not vary in amplitude.

In systems where point sources of noise are predominant, that is, where noise is introduced at one or more specific places in a receiver, an improvement in the noise figure of the receiver is possible by using an appropriate impedance mismatch between the input signal terminals and the source of noise. Some of the noise from the source of noise travels toward the input generator, that is, the signal source, and is reflected partially at the mismatch. This reflected wave reinforces and diminishes various noise frequency voltages at the noise source depending upon the phase and amplitude of the reflected wave at the various noise frequencies when it arrives back again at the source of noise. The improvement in noise figure is dependent upon the fact that the position of discontinuity or mismatch will affect different frequencies unequally. In other words the phase relationship between the reflected component of noise and the original noise signal component at the noise source at any particular frequency is dependent upon the position of the mismatch in the transmission line. This means that frequency selective noise cancellation can occur, that is, the reflected component of noise can be adjusted to diminish the vector sum of the incident noise signal and the reflected component of noise within a chosen band (which may be centered around the signal frequency). Therefore, even though the power gain or energy transfer is less where there is a mismatch, the frequency selectivity of the mismatch can be optimized to cause the noise component at and near the signal frequency to be attenuated. Therefore, this results in a decrease in noise amplitude at and near the signal frequency at the noise source and within certain limits an improvement in the noise figure of the receiver.

In FIG. 1 there is illustrated in block diagram form a portion of a receiver including an antenna 10, a mismatch 12, and a first network A which in this case is a crystal converter but which may be any network for which the noise originating therein can be represented as originating at one particular point. In block A the noise originating therein is represented at generator 26, as a matter of convenience, as being in series with the output of the converter as is the case where a crystal diode is utilized in the converter stage. The noise source represented by generator 26 could equally well be represented as an equivalent generator in parallel with the output of the converter of network A. Block B represents an intermediate frequency amplifier. In block B the noise originating therein is represented as emanating from one point (generator 28 which is assumed for convenience to be in series with the input to network B.) Network B, which in this embodiment of the applicants' invention represents an intermediate frequency amplifier, is assumed to introduce noise at the input to said amplifier. The output from network B may be transmitted to a detector stage or another amplifier depending upon the particular type of radio receiver. The numerals 18 and 24 designate transmission lines interconnecting the antenna 10 and the converter stage A and the converter stage A and the intermediate frequency amplifier B, respectively. In microwave receivers transmission lines 18 and 24 would probably be wave guide type transmission lines.

The noise generators 26($T_A$) and 28($T_B$) will be assumed to be uncorrelated which means that they will never be generating the same frequency at the same time. This means that the effects they produce on the noise figure of the system can be considered separately.

As has been stated FIG. 1 shows two networks, A and B, which can represent the converter stage and the first intermediate frequency stage of a radio receiver. The overall noise figure, F, if the mismatch 12 is not present, is given by the equation $$F=F_A+\frac{F_B-1}{G_A} \quad (1)$$

where $F_A$=noise figure of network A
$F_B$=noise figure of network B
$G_A$=power gain of network A. (When a loss is present $G_A$ becomes a fraction.)

Let the antenna stage 10 and networks A and B in FIG. 1 all be impedance matched so that the conditions of maximum power transfer are present. Assume that all noise generated within A is correctly represented by noise generator 26 at the output thereof having an equivalent temperature $T_A$. (We are restricting the analysis to a network where all excess noise is injected into the network at one point rather than being continuously distributed.) We assume for the moment that the noise is injected in series with the output terminals of A as shown in FIG. 1.

As indicated in FIG. 1, the forward power gain of network A is $G_A$ and the reverse power gain is $G_R$, where $G_R$ is not equal to $G_A$ in general. There can be a reverse power gain only when the network A is bilateral in nature. A vacuum tube operating in the region where there is no grid current cannot be said to be a bilateral element. However, a varistor crystal diode is such an element. The noise temperature T seen at the output of the network producing $G_A$ is assumed to be 290 degrees Kelvin as indicated in FIG. 1. Also shown in FIG. 1 is generator $e_s$ representing the received signal at the antenna 10, the generator impedance R and the generator noise source $T_G$ (at 290 degrees Kelvin). Now, since matched conditions were assumed throughout, the noise figure of network A can be evaluated:

$$F_A=\frac{k\,290°\,B+kT_AB}{G_Ak\,290°\,B}=\left(1+\frac{T_A}{290°}\right)\cdot\frac{1}{G_A} \quad (2)$$

Hence, the over-all noise figure, F, becomes:

$$F=\frac{\frac{T_A}{290°}+F_B}{G_A} \quad (3)$$

For an understanding of the development of the above equations see "Bell System Technical Journal," volume 28, pages 608–618, October 1949, by W. W. Mumford.

Now let us consider FIG. 1 with the mismatch 12 inserted in the line 18 between network A and the antenna 10. The mismatch 12 will be considered to be a linear lossless mismatch for simplicity of the equations. "Linear" means that the impedance which the mismatch presents is a first order function of frequency, and is independent of amplitude. Although a linear lossless mismatch is the most advantageous it will be obvious that some improvement in the noise figure could occur even if the mismatch were not lossless or linear. In FIG. 1, $\rho_G$ and $\rho_A$ denote the voltage reflection coefficients seen by the antenna 10 and the original network A, respectively, looking into the linear, lossless, mismatch network 12 in each case. Thus, $$\left.\begin{aligned}\rho_G&=|\rho|\epsilon^{j\theta_G}\\ \rho_A&=|\rho|\epsilon^{j\theta_A}\end{aligned}\right\} \quad (4)$$

where $|\rho|$ is equal to the magnitude of the reflected component of the wave at the signal frequency incident upon the mismatch 12 and $$\epsilon^{j\theta_A} \text{ and } \epsilon^{j\theta}A$$

represent the phase angles between the reflected and incident waves at the signal frequency at the positions designated in FIG. 1 as $\rho_G$ and $\rho_A$.

Calling the network formed by combining the original network A and the mismatch 12, A', it can be shown that its gain is given by $$G_{A'}=G_A(1-|\rho|^2)$$

and its noise figure by $$F_{A'}=\frac{G_{A'}k\ 290°\ B+(1-G_A)k\ 290°\ B+kT_AB|1-\rho_B|^2}{G_{A'}k\ 290°\ B}$$

$$F_{A'}=\frac{(1-|\rho|^2G_A)+\frac{T_A}{290°}(|1-\rho_B|^2)}{G_A(1-|\rho|^2)}\ \text{(where } T_A \text{ is in series)} \qquad (5)$$

where $\rho_B$ is the reflection coefficient seen at the noise generator 26($T_A$) looking back toward the mismatch where:

$$\rho_B=|\rho|\sqrt{G_AG_R}\epsilon^{j\theta_B}$$

From Equation 5 and the above expression for $\theta_B$ it is observed that $\theta_B$ should be equal to $0\pm2n\pi$, to minimize $F_{A'}$. The significance of making $\theta_B$ (which is the angle between the incident and reflected waves at the signal frequency emanating from generator 26($T_A$)) equal to $0\pm2n\pi$ is that this means the incident component of noise at the signal frequency and the reflected component of noise at the signal frequency at noise source 26 are 180 degrees out of phase (since the reflection coefficient was assumed to be negative) and the optimum noise cancellation occurs at the signal frequency itself. As the frequency varies around the signal frequency the cancellation becomes less and less until the components become additive as can be readily extrapolated. Since the phase angle $\theta_B$ can be arbitrarily shifted by changing the position of the mismatch on the transmission line, we assume that $\theta_B$ has been adjusted to zero. Now assuming that the mismatch 12 does not affect the noise figure $F_B$ of network B, the new over-all noise figure F′ is:

$$F'=F_{A'}+\frac{F_B-1}{G_{A'}}$$

Thus, with $\theta_B=0$, $$F'=\frac{\frac{T_A}{290°}(1-|\rho|\sqrt{G_AG_R})^2+(F_B-|\rho|^2G_A)}{G_A(1-|\rho|^2)} \qquad (6)$$

The assumption that the mismatch 12 does not affect the noise figure $F_B$ of network B is not an absolutely valid assumption. However, in most microwave receivers, the noise introduced at generator 28($T_B$) will be much less than that introduced at generator 26($T_A$) and therefore this is a reasonable assumption. The effect of the mismatch 12 upon network B is taken into consideration in the description of other embodiments of the applicants' invention illustrated in FIG. 2 and FIG. 3.

Now comparing F′ with F of Equation 5 (no mismatch), we notice that the effect of the (properly positioned) mismatch is to reduce the effect of generator 26 or $T_A$ on the over-all noise figure. At the same time it reduces the gain. However, for small mismatches the reduction in gain is slight compared to the reduction of the effect of generator 26. Hence, there exists an optimum mismatch of reflection coefficient $|\rho_0|$, which satisfies the following relation:

$$\frac{F_B-G_A}{T_A/290°}=\left(\frac{1}{|\rho_0|}-\sqrt{G_AG_R}\right)(\sqrt{G_AG_R}-|\rho_0|) \qquad (7)$$

With a mismatch of magnitude $|\rho_0|$ and adjusted to have $(0\pm2n\pi)$ phase angle at the output of A, the over-all noise figure F′, Equation 6, is a minimum.

In an analogous manner it can be shown that if the noise generator 26 or $T_A$ is a shunt current generator across the output of A (instead of the series generator assumed above), the noise figure of network A′ becomes $$F_{A'}=1+\frac{T_A}{290°\ G_A}\left(\frac{|1+\rho_B|^2}{1-|\rho|^2}\right)\text{(shunt } T_A) \qquad (8)$$

Hence, $F_{A'}$, will in this case (shunt $T_A$) be minimized if $\theta_B$ is $(\pi\pm2n\pi)$. This simply means that the mismatch must be moved one-half wavelength of the signal frequency on the transmission line if the noise is introduced in parallel to the output of network A.

In the foregoing mathematical proof it has been shown that an advantageous cancellation of noise generated at the output of the converter stage of a radio receiver can be accomplished by inserting a mismatch between the antenna and the input to the converter stage. This advantageous noise cancellation results in an improvement in the noise figure and consequently the sensitivity of the radio receiver. It has been shown that there is an optimum position to place the mismatch in the transmission line 18 between the antenna and the converter stage. As was previously stated the position of the mismatch in the transmission line 18 determines the frequency selectivity of the mismatch, that is, there will be a position in the transmission line 18 wherein a mismatch can be inserted that will adversely affect the signal frequency less than the noise in the signal band. From the mathematical equations given above, it can be seen that this optimum position of the mismatch 12 occurs periodically along the transmission line 18, that is, the mismatch can be placed at different spots in the transmission line separated by one wavelength of the optimized or signal frequency from the spot nearest the first stage or in this case the converter stage of the radio receiver. The transmission line 18 has been assumed to be a lossless line, and if it were not lossless then the optimum location would be that nearest the converter.

The mismatch 12 is frequency selective and the noise or unwanted frequencies within the band have been attenuated but all the frequencies within the band including the signal from the antenna stage 10 have been diminished due to the mismatch 12. Therefore, a mismatch of an optimum reflection coefficient must be inserted between the antenna and converter stage of the radio receiver at an optimum point to provide an optimum improvement in the noise figure of a radio receiver and hence the sensitivity of that receiver.

As mentioned earlier, the effect of the mismatch 12 on the noise figure of networks B, $F_B$, was neglected. In the embodiment of the invention shown in FIG. 2, the effect of the mismatch 12 on the noise figure of networks B, $F_B$, is not neglected. Even though the most controlling source of noise may originate in network A, still a further improvement in the over-all noise figure of the radio receiver can be obtained by reducing the noise figure of network B. FIG. 2 is essentially the same circuit as FIG. 1 except that a phase shifter 20 has been inserted in the transmission line 24 between the first stage A and the second stage B. The purpose of the phase shifter 20 is to adjust the phase of the wave originating at generator 28($T_B$) which is reflected at the mismatch 12 through network A towards network B. The noise generator 28 was not taken into consideration when the optimum position and optimum reflection coefficient of the mismatch 12 were determined, because the noise generator 26 and the noise generator 28 were taken as uncorrelated as has been previously stated. This will be true in almost all cases. As has been seen in Equation 1 the noise figure of the network B will have an effect on the over-all noise figure of the receiver. It is also possible to improve the noise figure of network B by utilizing the mismatch 12 between the antenna and converter stage of the receiver. The noise originating at generator 28($T_B$) travels down the transmission line 24 into the phase shifter 20 through network A and is reflected at the mismatch 12. The reflected wave then travels back through network A, the phase shifter 20, the transmission line 24 to the input of network B. The magnitude of the reflected wave will be determined by the magnitude of mismatch 12 and the parameters of network A but the phase relation between the reflected wave and the incident wave will be controlled by the phase shifter 20. By a straight-forward extension of the analysis of FIG. 1, that is, by optimizing the phase relationship of the reflected and incident components of generator 28($T_B$) (as has been taught) at the signal frequency, it can be seen that a mismatch in the transmission line between the antenna and converter stage of the radio receiver can be adapted to improve the noise figure of the second stage of the radio receiver if an appropriate phase shifter is inserted in the transmission line between the converter and second or intermediate frequency stage.

FIG. 3 illustrates another embodiment of the invention in which a mismatch 22 is inserted in the transmission line 24 between the phase shifter 20 and the network B. The phase shifter 20 could not optimize the coefficient of reflection at the mismatch 12 of the noise originating at generator 23 since this was determined by the mismatch 12 which was designed to optimize the coefficient of reflection for the noise originating at generator 26. Therefore, if a mismatch 22 is positioned at an optimum spot on the transmission line 24 in a manner previously taught with regard to FIG. 1, it can be seen that the noise figure of network B can be further improved. Part of the noise originating at the noise generator 28 is reflected at the mismatch 22 but part of the wave is transmitted through the mismatch 22 through the phase shifter 20, the network A, the mismatch 12 back through network A, the phase shifter 20 through the mismatch 22 and back to the noise source at the input to network B. Therefore, in calculating the optimum reflection coefficient of the mismatch 22, the wave reflected at mismatch 12 must be taken into account.

It is obvious by straightforward extension of the above teachings that this invention is applicable to an indefinite number of stages in systems where the most significant sources of noise are uncorrelated and can be represented as originating at distant points within that system.

What is claimed is:

1. In a radio receiver, an antenna circuit, a frequency converter having bilateral transmission, transmission means interconnecting said antenna circuit and said converter, said antenna circuit, transmission means, and coverter, respectively, having impedances which, taken alone, provide for maximum power transfer between said antenna circuit and said converter, and means for minimizing the effect of circuit noise originating at the output of said converter, comprising an impedance mismatch positioned in said transmission means to reflect noise originating at the output of said converter and traveling toward said antenna circuit, back to the output of said converter 180 degrees out of phase at the input signal frequency with the noise originating at said output, the degree of mismatch introduced being effective to cause a greater reduction in the noise at the output of said converter than the reduction in power transfer of the input signal between said antenna circuit and said converter.

2. In a radio receiver, an antenna circuit, a frequency converter having bilateral transmission, an intermediate frequency section, transmission means interconnecting, in order, said antenna circuit, said converter, and said intermediate frequency section, respectively, said antenna circuit, said converter, and said transmission means having impedances which, taken alone, provide for maximum power transfer between said antenna circuit and said converter and between said converter and said intermediate frequency section, and means for minimizing the effect of circuit noise originating at the output of said converter comprising an impedance mismatch placed in said transmission means to reflect noise originating at the output of said converter and traveling toward said antenna circuit back to the output of said converter 180 degrees out of phase at the input signal frequency with the noise originating at said output, the degree of mismatch $|\rho_0|$ being determined in accordance with the following relationship:

$$\frac{F_B-G_A}{T_A/290^\circ}=\left(\frac{1}{|\rho_0|}-\sqrt{G_AG_R}\right)\left(\sqrt{G_AG_R}-|\rho_0|\right)$$

where $F_B$ is the noise figure of said intermediate frequency section, $G_A$ is the power gain of said converter, $G_R$ is the reverse power gain of said converter, and $T_A$ is the noise temperature at the output of said converter.

3. In a radio receiver, an antenna circuit, a frequency converter having bilateral transmission, an intermediate frequency section, first transmission means interconnecting said antenna circuit and said converter, second transmission means interconnecting said converter and said intermediate frequency section, said antenna circuit, said converter, and said first and second transmission means having impedances which, taken alone, provide for maximum power transfer between said antenna circuit and said intermediate frequency section, and means for minimizing the effect of circuit noise originating at the output of said converter, comprising an impedance mismatch positioned in said first transmission means to reflect noise originating at the output of said converter and traveling toward said antenna circuit back to the output of said converter 180 degrees out of phase at the input signal frequency with the noise originating at said output, the degree of mismatch introduced being effective to cause a greater reduction in the noise at the output of said converter than the reduction of power transfer in the input signal between said antenna circuit and said converter, and a phase shifter inserted in said second transmission means to transmit noise originating at the input of said intermediate frequency section and reflected toward said converter from said mismatch back to the input of said intermediate frequency section 180 degrees out of phase at the input signal frequency with the noise originating at said input.

4. In a radio receiver, an antenna stage, a crystal converter stage introducing a substantial portion of the noise of the receiver at the intermediate frequency, an intermediate frequency stage, first transmission means interconnecting said antenna stage and said crystal converter stage, second transmission means interconnecting said antenna stage and said intermediate frequency stage, said antenna stage, converter stage, intermediate frequency stage, and said first and second transmission means all having impedances which, taken alone, provide for maximum power transfer between said antenna stage and said intermediate frequency stage, an impedance mismatch positioned in said first transmission means to reflect noise originating at the output of said converter stage and traveling toward said antenna stage back to the output of said converter stage 180 degrees out of phase at the input signal frequency with the noise originating at said output, the degree of mismatch of said first mismatch being effective to cause a greater reduction in the noise at the output of said converter than the reduction in power transfer of the input signal between said antenna stage and said converter stage, a phase shifter inserted in said second transmission means arranged to adjust the phase of the noise originating at the input of said intermediate frequency stage which travels toward and is reflected at said first mismatch to return to the input of said intermediate frequency stage 180 degrees out of phase at the intermediate frequency with the input signal to said intermediate frequency stage, and a second mismatch inserted in said second transmission means between said phase shifter and said intermediate frequency stage to reflect noise originating at the input of said intermediate frequency stage to return to the input of said stage 180 degrees out of phase at the frequency of the input signal at said intermediate frequency stage with the input signal at that point.

References Cited in the file of this patent

UNITED STATES PATENTS 2,753,526 Ketchledge ______________ July 3, 1956

FOREIGN PATENTS 467,332 Great Britain __________ June 10, 1937